Feb. 19, 1957 H. A. STORCH 2,782,069
DRAFT STRIP FOR LOWERABLE GLASS PANE ON A VEHICLE
Filed Nov. 30, 1953 2 Sheets-Sheet 1
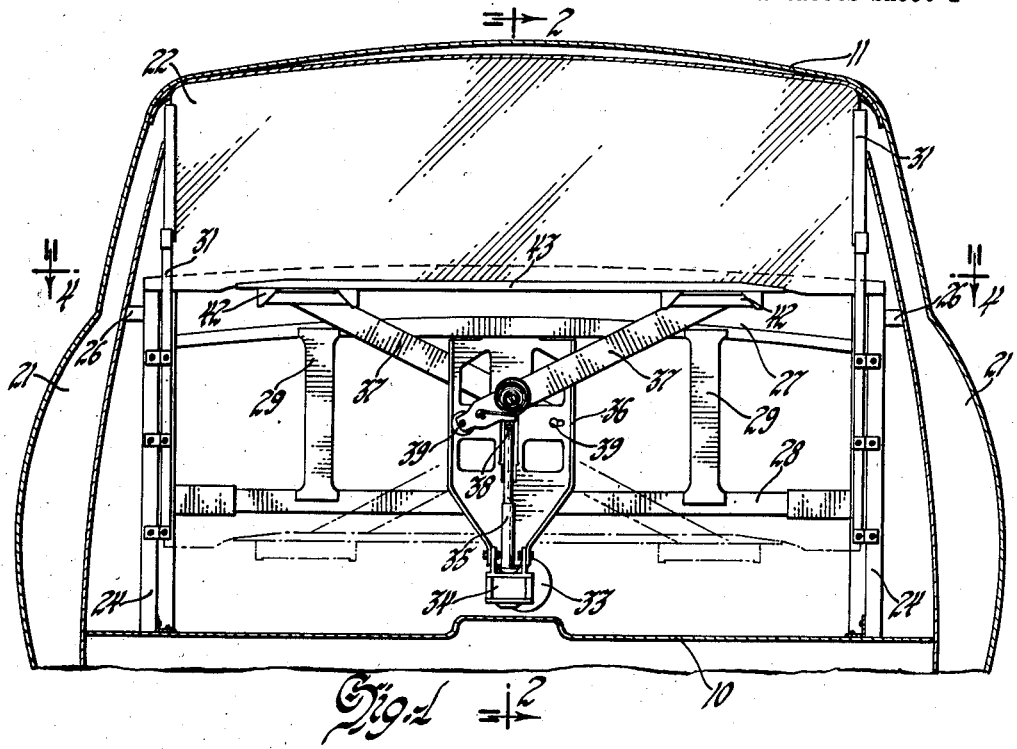
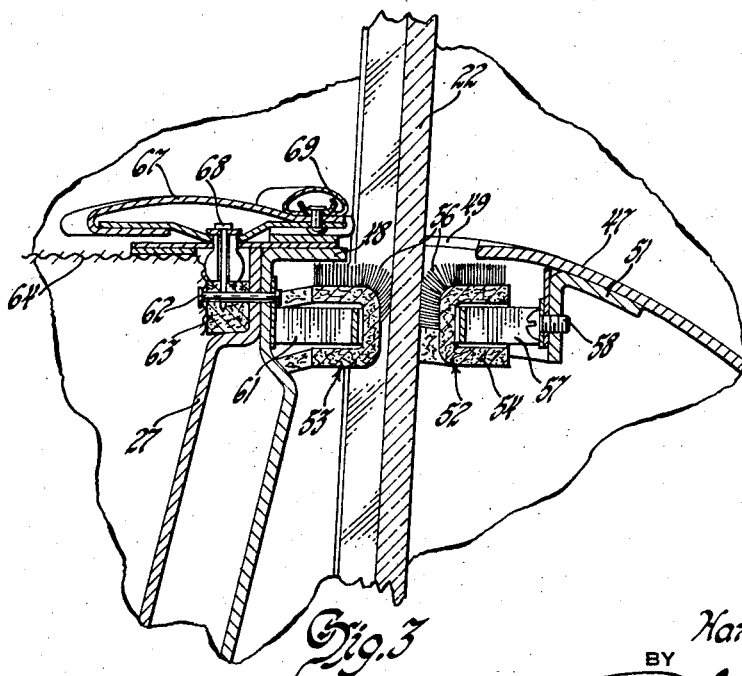
INVENTOR
Harold A. Storch
BY
Paul Fitzpatrick
ATTORNEY Feb. 19, 1957 H. A. STORCH 2,782,069
DRAFT STRIP FOR LOWERABLE GLASS PANE ON A VEHICLE
Filed Nov. 30, 1953 2 Sheets-Sheet 2

INVENTOR
Harold A. Storch
BY
Paul Fitzpatrick
ATTORNEY

United States Patent Office 2,782,069
Patented Feb. 19, 1957

2,782,069

DRAFT STRIP FOR LOWERABLE GLASS PANE ON A VEHICLE

Harold A. Storch, Birmingham, Mich., assignor to General Motors Corporation, Detroit, Mich., a corporation of Delaware Application November 30, 1953, Serial No. 394,991

4 Claims. (Cl. 296—44)

My invention relates to passenger vehicles. One aspect of the invention relates primarily to an improved installation of the center partition and the retractable glass thereof in a limousine type automobile. Another aspect of the invention relates to improved sealing arrangements or draft strip installations for retractable windows, particularly those which are curved.

Passenger bodies of the limousine or berline type with a center partition or division glass are well known. In order to provide additional leg room in the rear compartment of such bodies, it has been proposed, as in U. S. Patent No. 1,921,263, to mount the glass so that the lower end moves in a curved path and thus swings forwardly as the glass is lowered. It has also been proposed to use a glass, a section of which taken on a vertical plane is curved, and mount the glass in suitable curved glass run channels. According to my invention the division glass is of compound curvature; that is, curved in both the vertical and horizontal planes, thus providing increased leg room for the rear seat passengers and additionally providing a more attractive installation by virtue of the pleasing curvature of the partition glass. A feature of the invention lies in the fact that the center partition is a structural unit independent of the front seat, which may thus be adjustable for the comfort of front seat passengers.

The installation of compound curved glass increases the difficulty of providing suitable bearing or draft strips where the glass emerges from its housing in the partition.

According to an aspect of the invention, each draft strip is of a flexible construction so that it readily accommodates itself to the curvature of the glass, and is resiliently urged into contact with the glass. This yielding or flexible character of the glass bearing strips and their mounting is very important because it permits accommodations to variations in the curvature of the glass.

Such variation may be a matter of design, but, in any event, commercially available compound curved glass is subject to considerable departures in curvature from the design contours.

The principal objects of the invention are the improvement of vehicle bodies, the provision of an improved center partition arrangement for divided bodies, and the provision of an improved glass bearing or draft strip which is mounted so as to accommodate itself to variations in the contour of the glass.

The nature of the invention and the advantages thereof will be more clearly apparent from the succeeding detailed description of the preferred embodiment of the invention and the accompanying drawings, in which:

Fig. 1 is a transverse sectional view of an automobile body taken on a plane passing through the body rearwardly of the driver's seat, looking forward, with certain parts cut away;

Fig. 3 is a greatly enlarged view of a portion of Fig. 2; and

Figure 2:
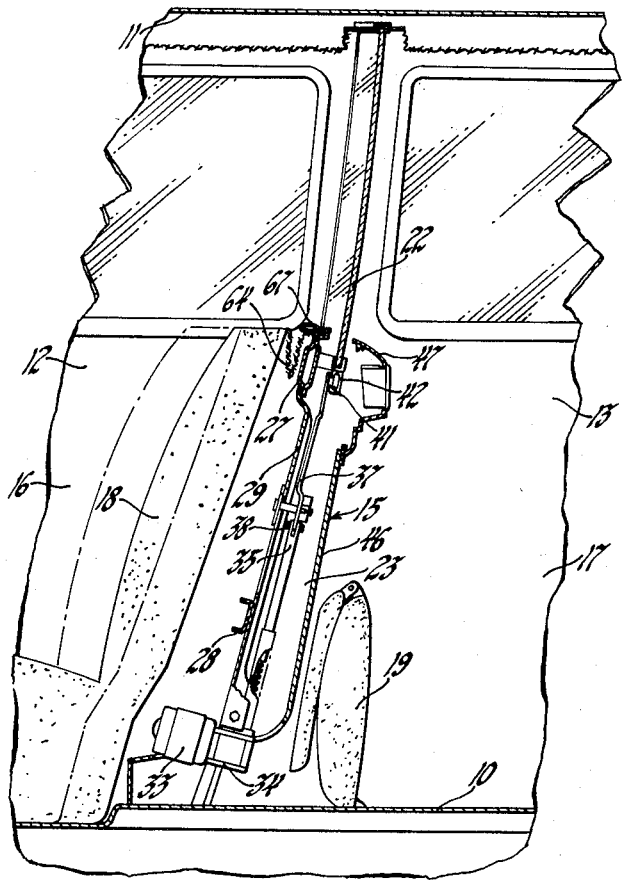
Fig. 2 is a partial longitudinal sectional view of the body taken on the plane indicated in Fig. 1.

Referring first to Figs. 1 and 2, there is illustrated an automobile body comprising a floor pan 10, a roof panel 11, a front door 12, a rear door 13, and a center partition indicated generally as 15. This partition divides the body into a front compartment 16 and a rear compartment 17, the driver's seat 18 being mounted in the front compartment. A folding or jump seat 19 and the usual rear seat (not shown) are installed in the rear compartment. The roof panel is supported by and the doors abut body center pillars 21 (Fig. 1). The partition 15, which is mounted approximately in the same plane as the center pillars 21, comprises a fixed lower portion and a retractable partition or division glass 22 which may be lowered into the space 23 in the lower part of the partition. The center partition from a structural standpoint comprises uprights 24 (Fig. 1) fixed to the floor pan and which may be appropriately anchored at 26 to the center pillars. An upper transverse frame member 27 and a lower transverse frame member 28 extend between the uprights 24 and are reinforced by vertical frame members 29.

The glass 22 slides in a generally vertical direction in conventional glass run channels 31 supported on the uprights 24 and the body pillars 21. Raising and lowering of the glass may be effected by any suitable device, commonly known as a window regulator. As illustrated in Figs. 1 and 2, the preferred installation comprises an electric motor 33 coupled through reducing gear 34 to a jackscrew 35. The motor and jackscrew are supported on a plate 36 mounted on the members 27 and 28. Levers 37 are coupled at 38 to the upper end of the jack. The ends of the levers are slidably pivoted at 39 on the plate 36 and the outer ends of the levers are fitted with rollers 41 received in tracks 42 fixed to the channel 43 at the lower edge of the partition glass 22. The regulator is shown in its retracted position in Fig. 1 in broken lines. It will be apparent that any suitable type of regulator could be used.

The lower part of the center partition includes an ornamental or trim panel 46 suitably supported on the frame of the partition which conceals the frame and window regulator and defines the rear wall bounding space 23. A molding 47 at the upper edge of the trim panel 46 and the edge or flange 48 of the member 27 define between them an aperture 49 in the partition through which the glass 22 is projected.

Figure 4:
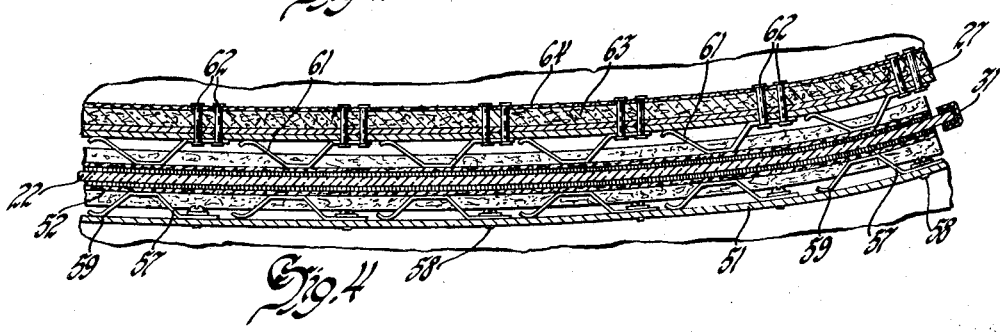
Fig. 4 is a horizontal sectional view taken on the plane indicated in Fig. 1.

This aperture is curved in plan in accordance with the curvature of the glass, which is most clearly indicated in Fig. 4. A V-shaped strip 51 welded or otherwise fixed to the molding 47 supports the rear draft strip 52 and the rail 27 supports the front draft strip 53. These two strips are alike in structure and mounting. Each comprises a channel section strip 54 of felt or the like, the upper part of which is provided with a velvety pile 56 which bears against the surface of the glass. Each draft strip is supported by a number of trapezoidal leaf springs. The springs 57 which support the rear draft strip are fixed by screws 58 to the angle bar 51. As will be apparent from Fig. 4, each spring is fixed at one end and the other end, at 59, bears against the supporting surface of the bracket 51. The forward draft strip 53 is supported on springs 61 of the same shape as the springs 57, the springs 61 being fixed to the upper portion of the frame member 27 by rivets 62. These rivets pass through a nailing strip 63 mounted on the member 27 and also serve to retain the flexible valance 64 which extends from the top of the seat back to the center partition. This valance is shown extended in Fig. 3 and folded in Fig. 2.

As shown in Fig. 3, a top rail 67 is fastened to the nail strip 63 by nails 68 and a finishing molding 69 is mounted on the rail 67.

As will be apparent, the upper surfaces of the strips 52 and 53 are closely adjacent the members 48 and 47, respectively, and since the faces of the draft strips engage the faces of the glass, the strips provide a suitable seal against circulation of air from the front compartment under the glass and back up along the rear face of the glass into the rear compartment when the glass 22 is raised.

The strips 52 and 53 also serve to support the glass to some extent and to close the opening between the parts 48 and 47.

Because of the flexible character of the draft strips and the support arrangement by which they are yieldingly supported at a number of points, the draft strips can move forwardly or rearwardly and deflect locally to conform to the contour of the glass and thus provide effective sealing with a very considerable tolerance of variations in the curvature of the glass. The curvature of the glass provides better conformity to modern principles of design of vehicles and increases the attractiveness of the automobile by the presence of a pleasing curve rather than a straight line across the center partition.

The principles of the invention embodied in structure similar to that described herein may be employed in various applications where circumstances call for it as, for example, in the rear quarter windows, the back windows, or the door glasses of motor vehicles. It will also be appreciated, of course, that the invention is applicable in the case of a lowerable panel whether the panel be of glass or some other transparent or opaque material.

The normal installation will involve draft strips to provide sealing on both sides of the glass, but the structure could be employed to seal only one side of the glass if desired.

The sealing or draft strip arrangement of the invention, because of its yielding character and ability to conform to variations in position of the surface against which it seals, is particularly suited to installations of the following nature:

Those involving accommodation to variations in compound curved glass surfaces as described above.

Where it is desirable to give constant and controllable sealing pressures on retractable panels whether they be flat, simply curved, or compound curved.

Installations where the strip of the invention will yield sufficiently to provide for movement of flat or other panels at a slight angle to the surface, or on an arc.

The structure of the invention may also compensate for variations in the supporting or framing structure enclosing and moving the glass or other panel.

The detailed description of the preferred embodiment of the invention for the purpose of illustrating the principles thereof is not to be construed as limiting the invention since many modifications thereof within the scope of the invention may be made by the exercise of skill in the art.

I claim:

1. In a vehicle body, in combination, a frame defining an opening, a curved glass disposable across the opening, means defining a housing for the glass at one side of the opening, means guiding the glass for retraction into the housing from a position across the opening, and a yieldably mounted draft strip extending across the glass adjacent the said side of the opening and engaging the glass, the draft strip comprising a channel-shaped strip of cushioning material with the outer face of the base of the channel engaging the glass and also comprising leaf springs extending from the means defining the housing into the channel-shaped strip at spaced points, the springs urging the channel against the glass.

2. In a vehicle body, in combination, a frame defining an opening, a glass disposable across the opening, means defining a housing for the glass at one side of the opening, means guiding the glass for retraction into the housing from a position across the opening, and a yieldably mounted draft strip extending across the glass transversely to the direction of retraction of the glass adjacent the said side of the opening and engaging the glass, the draft strip comprising a channel-shaped strip of cushioning material with the outer face of the base of the channel engaging the glass and also comprising leaf springs extending from the means defining the housing into the channel at spaced points, the springs urging the channel-shaped strip against the glass.

3. In a vehicle body, in combination, a frame defining an opening, a glass disposable across the opening, means defining a housing for the glass at one side of the opening, means guiding the glass for retraction into the housing from a position across the opening, and a yieldably mounted draft strip extending across the glass transversely to the direction of retraction of the glass adjacent the said side of the opening and engaging the glass, the draft strip comprising a channel-shaped strip of cushioning material with the outer face of the base of the channel engaging the glass and also comprising springs extending from the means defining the housing into the channel at spaced points, the springs urging the channel-shaped strip against the glass, and supporting and locating the channel-shaped strip by compression of the strip between the springs and the glass and by engagement of the springs between the walls of the channel.

4. In a vehicle body, in combination, a frame defining an opening, a glass disposable across the opening, means defining a housing for the glass at one side of the opening, means guiding the glass for retraction into the housing from a position across the opening, and a yieldably mounted draft strip extending across the glass transversely to the direction of retraction of the glass adjacent the said side of the opening and engaging the glass, the draft strip comprising a channel-shaped strip of cushioning material with the outer face of the base of the channel engaging the glass and also comprising sinuous leaf spring means mounted on and extending from the means defining the housing into the channel at spaced points, the springs urging the channel-shaped strip against the glass.

References Cited in the file of this patent

UNITED STATES PATENTS

| Number | Name | Date |
|---|---|---|
| 1,605,212 | Bourgon | Nov. 2, 1926 |
| 1,674,487 | Steger | June 19, 1928 |
| 1,921,263 | Rivard | Aug. 8, 1933 |
| 1,967,514 | Reid | July 24, 1934 |
| 2,068,505 | Morrison | Jan. 19, 1937 |
| 2,204,630 | Spraragen | June 18, 1940 |
| 2,273,684 | Bailey | Feb. 17, 1942 |
| 2,457,312 | Kramer | Dec. 28, 1948 |
| 2,499,136 | Edlund et al. | Feb. 28, 1950 |
| 2,504,510 | Ernest | Apr. 18, 1950 |
| 2,539,064 | Ernest | Jan. 23, 1951 |
| 2,632,668 | Keller | Mar. 24, 1953 |

FOREIGN PATENTS

| Number | Country | Date |
|---|---|---|
| 700,537 | France | Dec. 23, 1930 |